Aug. 27, 1929.　　　S. T. JESSOP　　　1,726,354
BRAKE LINING CLAMP
Filed Aug. 13, 1928
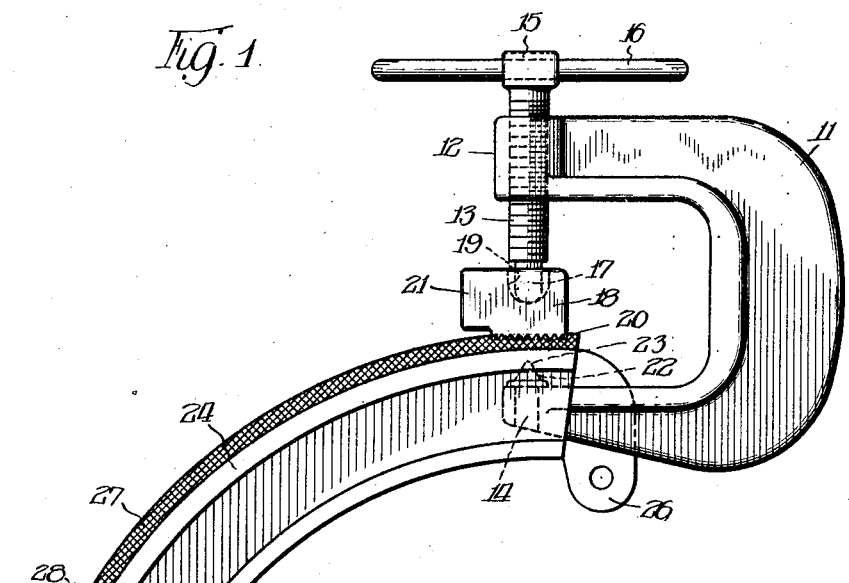
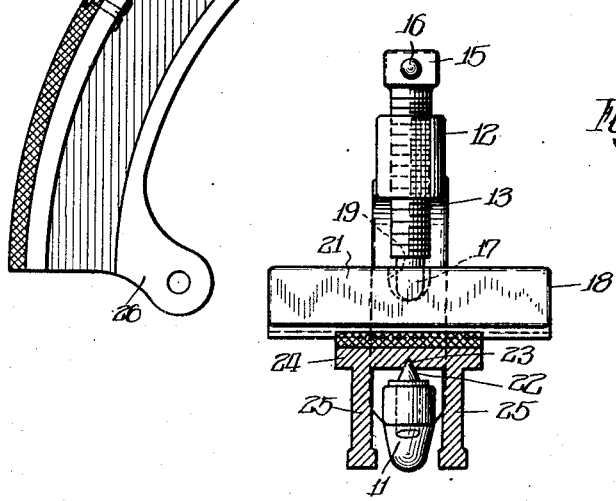
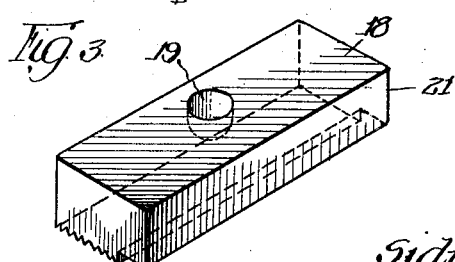
Inventor:
Sidney T. Jessop,
By Cromwell, Greist & Warden.
Attys.

Patented Aug. 27, 1929.

1,726,354

UNITED STATES PATENT OFFICE.

SIDNEY T. JESSOP, OF CHICAGO, ILLINOIS, ASSIGNOR TO S. T. JESSOP CO., INC., OF CHICAGO, ILLINOIS, A CORPORATION OF ILLINOIS.

BRAKE-LINING CLAMP.

Application filed August 13, 1928. Serial No. 299,167.

The present invention relates to brake lining clamps for use in stretching the lining taut over a brake shoe.

In brakes in which a lining is used, such as automobile brakes, it is necessary that the surface of the lining be perfectly smooth in order that the brake may grip evenly and effectively. Smoothness of the lining is obtained by stretching the same until it is taut over the shoe at the time of application.

The primary object of the present invention is the provision of a device of the character described for stretching brake linings taut on a brake shoe. The device is particularly adapted for use with the heavier weight linings now commonly applied, although it is equally effective with lighter linings.

Another object of the invention is the provision of a brake lining clamp which is simple in construction and effective in operation. Other objects and advantages of the invention will be obvious to those skilled in the art upon understanding of the same.

A preferred embodiment of the invention is shown in the accompanying drawings and described in the specification. This disclosure of the invention is given for illustrative purposes only as various modifications may be made in the structure of the device without departing from the true spirit and scope of the invention.

In the drawings—

Fig. 1 is a view in side elevation showing the clamp attached to a brake shoe;

Fig. 2 is a view in front elevation showing the brake shoe in section, and

Fig. 3 is a view in perspective showing the clamping bar which grips the brake lining.

The device comprises a U-shaped frame 11 having at the end of one leg an enlarged portion 12 which is drilled and tapped to receive a bolt 13. The other leg is drilled coaxially with the drilling in the enlarged portion 12 to receive a pin 14. The head 15 of the bolt 13 is drilled to receive a pin 16 which serves as a handle member for turning the bolt. The other end of the bolt 13 is provided with a rounded tip 17. The pin 14 is provided with a head 22 which is substantially conical in shape terminating in a point 23.

Cooperating with the bolt 13 is an elongated clamping bar 18 which is drilled at the medial portion of its upper side to form a spherical recess 19 of slightly larger diameter than the bolt tip 17. Effective means for engaging the lining is provided on the bottom surface of the clamping bar 18 in the form of serrations 20. A boss 21 projects from one side of the clamping bar a short distance above the serrations 20 and extends the full length of the clamping bar.

What is known as a U-shaped brake shoe is shown in the drawing. This shoe comprises a brake flange 24 provided with a pair of annular ribs 25 spaced apart and projecting from the inner periphery of the brake flange. Integral with the ribs 25 and at the ends thereof are the usual fastening members 26. A brake lining 27 is secured at one end to the brake shoe by means of rivets such as indicated by the numeral 28 in the usual manner.

In order to draw the lining taut over the brake shoe the clamp is now placed as indicated in the drawings with the clamping bar 18 positioned lengthwise across the brake band 27 with the serrations 20 in engagement with the lining and the pin 14 in engagement with the underside of the brake shoe. The bolt 13 is screwed down so as to firmly engage the point 23 of the pin 14 with the under side of the brake shoe and cause the serrations 20 of the clamping bar to firmly engage the lining 27. Once the clamp is in position the boss 21 of the clamping bar is struck with a hammer at the proper points to draw the lining tight. After the lining has been drawn to the proper degree of tension to cause it to fit the shoe snugly it is fastened in place by means of rivets in the usual manner.

During the stretching operation the clamping bar 18 remains in substantially flat engagement with the lining 27, the remainder of the tool pivoting on the pin 22 and the tip 17 of the bolt 13. The point 23 of the pin 22 tends to bite into the metal on the under side of the brake flange 24 so that it does not slip during the stretching operation. The serrations 20 remain in relatively flat contact with the lining as pivotal movement is permitted between the rounded tip 17 of the bolt 13 and the clamping bar 18 due to the spherical shape of the recess 19 and the bolt tip 17 and because of the play permitted due to the fact that the diameter of the recess 19 is greater than the diameter of the tip 17. The fact that the clamping bar is always in substantially flat engagement with the brake lining prohibits any slippage of the lining while it is being stretched for although the pressure on the lining may be slightly reduced due to the tilting of the tool it is sufficient to maintain the brake lining in firm frictional engagement with the brake shoe.

There are numerous commercial brake shoes now on the market in connection with which the clamp is intended for use. Should it be impossible to attach the clamp in the middle of the shoe the clamp may be placed at the side of the shoe so that the U-shaped supporting member 11 is parallel with the clamping bar 18. Special clamping bars may be employed having the recess 19 at various positions if desired.

I claim:

1. A brake lining clamp comprising means for engaging a brake lining, a clamp having one arm thereof provided with pressure means pivotally associated with said first mentioned means and the other arm thereof provided with a pin for pivotal connection with a brake flange.

2. A device of the character described comprising a lining engaging member having a projection thereon for receiving the blows of a striking instrumentality, a U-shaped member, pressure means associated with said U-shaped member and engaging with said lining engaging member, and a conical-shaped pin secured to the other leg of said U-shaped member.

3. A device of the class described comprising an elongated clamping member adapted to engage a brake lining and having a spherically-shaped recess in the top face thereof, a U-shaped member having a bolt screw-threaded in one of its legs, said bolt being provided with a spherically-shaped tip of less diameter than the diameter of said recess and adapted to project therein, and a conical-shaped pin member secured to the other leg of said U-shaped member in coaxial alignment with said bolt.

In testimony whereof I have hereunto subscribed my name.

SIDNEY T. JESSOP.